United States Patent Office 3,417,136
Patented Dec. 17, 1968

3,417,136
AMINOCARBOXYLIC ACIDS AND
SALTS THEREOF
Robert A. Hovden, Wayzata, Minn., assignor to Cargill, Incorporated, a corporation of Delaware
No Drawing. Filed Oct. 21, 1965, Ser. No. 500,334
8 Claims. (Cl. 260—534)

ABSTRACT OF THE DISCLOSURE

Amphoteric aminocarboxylic acids and salts having desirable surfactant properties, good color and increased wetting power and water solubility when compared to known aminocarboxylic acid surfactants, of the formula $RO[CH_2]_3N[H_n][R_1COOX]_{2-n}$ where R is an alkyl radical of from 6 to 24 carbon atoms and, in addition, may contain olefin oxide, $R_1$ is a straight or branched chain alkyl radical of from 1 to 3 carbon atoms, X is hydrogen or a positively charged salt forming radical, and $n$ is 0 or 1. The method for the manufacture of these compounds includes cyanoethylation of long chain alkyl alcohols having from 6 to 24 carbon atoms with acrylonitrile in the presence of an alkaline catalyst. The resulting β-alkoxypropionitrile is hydrogenated in the presence of a catalyst to γ-alkoxypropylamine. The γ-alkoxypropylamine is subsequently reacted with either 1 or 2 moles of a suitable acid forming reactant.

---

This invention relates generally to novel aminocarboxylic acid compounds and salts thereof, and, more particularly, it relates to novel amphoteric surfactant compounds of the formula $$RO[CH_2]_3N[H_n][R_1COOX]_{2-n}$$

where R is an alkyl radical of from 6 to 24 carbon atoms, $R_1$ is a straight or branched chain alkyl radical of from 1 to 3 carbon atoms, X is hydrogen or a positively charged salt forming radical, and $n$ is 0 or 1, and to a method of manufacturing such compounds.

The surfactant properties of aminocarboxylic acids and salts are generally known, and these compounds are useful in shampoos, cosmetics, and detergents. However, known aminocarboxylic acid surfactant compounds generally have a lesser solubility than is desired. Further, many of these known surfactant compounds do not have as great a wetting power as might be desired for certain applications. It would therefore be desirable to provide an improved surfactant compound which has increased water solubility and an improved color, and which provides surfactant properties equal to or better than the surfactant properties of known aminocarboxylic acids and salts.

It is a principal object of the present invention to provide novel aminocarboxylic acid compounds and salts thereof. A further object is to provide novel aminocarboxylic acid compounds which have improved surfactant properties. Another object is to provide novel aminocarboxylic acid compounds which have good color and increased water solubility and increased wetting power in dilute solutions. Yet another object is to provide a method of manufacturing aminocarboxylic acids and salts.

Other objects and advantages of the present invention will become apparent from the following detailed description.

Generally, the present invention is directed to novel aminocarboxylic acids and salts having the formula $$RO[CH_2]_3N[H_n][R_1COOX]_{2-n}$$

where R is an alkyl radical of from 6 to 24 carbon atoms, $R_1$ is a straight or branched chain alkyl radical of from 1 to 3 carbon atoms, X is hydrogen or a positively charged salt forming radical, and $n$ is 0 or 1, and to a method of manufacturing such compounds. It has been discovered that the aminocarboxylic acid of the present invention which include an alkoxypropyl group $$(ROCH_2CH_2CH_2-)$$

attached to the nitrogen atom exhibit desirable surfactant properties and have good color, low viscosity and increased wetting power and water solubility when compared to known aminocarboxylic acid surfactants.

The alkyl radical of the alkoxypropyl group preferably has from 6 to 24 carbon atoms and may be a saturated or unsaturated straight chain or branched chain radical. Saturated straight chain alkyl radicals of from 6 to 24 carbon atoms are preferred. However, compounds having an alkyl radical comprising branched carbon chains and/or unsaturated carbon chains are contemplated, and the alkyl radical may also contain from 1 to 10 mols of olefin oxide, preferably between about 1 and about 3.5 mols of olefin oxide. Good results have been obtained when the alkyl radical is a saturated straight chain radical of from 10 to 15 carbon atoms.

The novel amphoteric surfactant compounds of the present invention include both acids and salts thereof, and in the above formula X may be hydrogen or any positively charged salt forming radical, e.g., alkali metal, ammonium, or ethanolamine.

The novel aminocarboxylic acids of the present invention may be aminoacetic acids, aminopropionic acids, or aminobutyric acids, depending upon whether $R_1$ in the above formula comprises one, two, or three carbon atoms. As more fully discussed hereinafter, the number of carbon atoms in $R_1$ is dependent upon the particular reactants employed in the process for preparing the aminocarboxylic acids. It is also contemplated that $R_1$ may comprise a branched chain alkyl radical having a branch chain containing one carbon atom.

The novel amphoteric surfactant compounds of the present invention may be prepared from long chain alkyl alcohols having from 6 to 24 carbon atoms by a process which includes as a first step the cyanoethylation of the long chain alkyl alcohol with acrylonitrile in the presence of an alkaline catalyst, e.g., benzyltrimethylammonium hydroxide, potassium hydroxide, sodium methoxide, or sodium oxide, to form β-alkoxypropionitrile. The long chain alkyl alcohol raw material may be a primary or secondary alcohol and may be a straight chain or a branched chain alcohol. Saturated straight chain primary alcohols are preferred. It is contemplated to employ as a starting material long chain alkyl alcohols derived from natural sources such as fatty acids, straight or branched chain alcohols obtained from petroleum stocks, or branched chain alcohols manufactured by the oxo process.

The long chain alkyl alcohol and acrylonitrile may be reacted at temperatures between about 25° C. and about 80° C., depending upon the carbon chain length of the alkyl alcohol, in the presence of about 0.1 percent potassium hydroxide for a period of about five to about six hours. The reaction is generally exothermic and external cooling may be required to prevent polymerization of the acrylonitrile. The use of an organic solvent diluent also aids in reducing acrylonitrile polymerization. It is generally preferable to employ about 25 percent excess acrylonitrile. When the catalyst is benzyltrimethylammonium hydroxide, it has been found that the excess acrylonitrile may be as low as 5 percent. A yield of between about 95 and about 100 percent of β-alkoxypropionitrile is generally obtained.

The β-alkoxypropionitrile is then hydrogenated in the presence of a suitable catalyst, e.g., Raney nickel, to form γ-alkoxypropylamine. The hydrogenation of the oxypropionitrile is preferably carried out at a temperature of about 125° C. with a hydrogen partial pressure of about 300 p.s.i.g. and an ammonia partial pressure of about 200 p.s.i.g. Alternately, an ammonia partial pressure of between about 0 and about 300 p.s.i.g. and a hydrogen partial pressure of between about 200 and about 600 p.s.i.g. may be employed. A yield of about 95 to about 100 percent of γ-alkoxypropylamine is obtained. It is also contemplated to reduce the oxypropionitrile with a suitable reducing agent, e.g., lithium aluminum hydride, to form γ-alkoxypropylamine in place of the hydrogenation step.

The γ-alkoxypropylamine is then reacted with a suitable acid forming reactant. The term "acid forming reactant" is intended to include any compound which, when reacted with an oxypropylamine, forms a carboxylic acid or ester, or a compound which may be readily converted to a carboxylic acid or ester, e.g., by hydrolysis. As discussed hereinabove, the selection of the acid forming reactant determines whether the final product is an aminoacetic acid, aminopropionic acid, or aminobutyric acid. Suitable acid forming reactants which may be reacted with the oxypropylamine include compounds which have an acrylo group, e.g., acrylic acid, methacrylic acid, crotonic acid, and esters thereof, acrylonitrile, and methacrylonitrile. Other suitable compounds which may be reacted with the oxypropionitrile include β-propiolactone, butyrolactone and chloroacetic acid. It has been found that particularly desirable results are obtained when the acid forming reactant is acrylonitrile.

Chloroacetic acid reacts with γ-alkoxypropylamine to form N-(γ-alkoxypropyl)-aminoacetic acid. Acrylic acid and its esters, methacrylic acid and its esters, acrylonitrile, methacrylonitrile, crotonic acid and its esters and β-propiolactone react with γ-alkoxypropylamine to form N-(γ-alkoxypropyl)-β-aminopropionic acids and esters, and butyrolactone forms N-(γ-alkoxypropyl) - γ - aminobutyric acids. Crotonic acid forms a branched chain N-(γ-alkoxypropyl)-β-amino-(β-methyl) propionic acid and methacrylic acid forms a branched chain N-(γ-alkoxypropyl)-β-amino-(α-methyl) propionic acid. Accordingly, novel amphoteric surfactants having specific properties suitable for use in specific environments may be prepared in accordance with the present invention by selection of a suitable long chain alkyl alcohol and acid forming reactant.

Aminocarboxylic or iminodicarboxylic acids may be prepared in accordance with the disclosed method depending upon the number of equivalents of the acid forming reactant employed. Aminocarboxylic acids may be prepared by reacting one equivalent of the acid forming reactant with one equivalent of oxypropylamine, and iminodicarboxylic acid compound may be prepared by reacting two equivalents of the acid forming reactant with one equivalent of oxypropylamine. As used herein the term "aminocarboxylic acid," when used in a generic sense includes iminodicarboxylic acids.

The reaction between the oxypropylamine and the acid forming reactant is preferably, but not necessarily, carried out in the presence of a suitable solvent, e.g., 5 percent by weight, methyl alcohol. Except for the reaction between the oxypropylamine and two mols acrylonitrile, a catalyst is generally not necessary since the amine is sufficiently basic to catalize the reaction. An acid catalyst, preferably sulfuric acid at a level of about 0.5 percent by weight of the oxypropylamine, is generally desired where the acid forming reactant is acrylonitrile, and when it is desired to react two mols of acrylonitrile with the amine. Aminocarboxylic acids of the present invention may be prepared at a temperature of between about 20° C. and about 75° C., and iminodicarboxylic acids may be prepared at a temperature of between about 50° C. and about 125° C.

The product of the reaction between the oxypropylamine and the acid forming reactant will be an acid, an ester or a nitrile depending upon the particular acid forming reactant employed. When the acid forming reactant is an acid the product will be a free acid, which may be neutralized to a salt by an alkali metal hydroxide or an organic salt forming compound such as ammonia or mono-, di-, or tri-ethanolamine.

When the acid forming reactant is an ester, e.g., methylacrylate, the product will be in the form of an ester of an aminocarboxylic acid. The ester may be hydrolyzed to a free acid with water, or to a salt by an alkali metal hydroxide. The hydrolysis of the ester may be carried out at about 100° C. or other suitable temperatures.

When the acid forming reactant is acrylonitrile or methacrylonitrile, the product obtained by the reaction between the acrylonitrile and the oxypropylamine is a nitrile. The reaction is preferably carried out at a temperature between about 50° C. and about 125° C. in the presence of an acid catalyst and an excess of up to about fifteen percent acrylonitrile when it is desired to react two mols of acrylonitrile with the oxypropylamine, and at a temperature of between about 20° C. and about 75° C. without any catalyst when it is desired to react one mol of acrylonitrile with the oxypropylamine. The reaction is carried out in the presence of between 2 percent and about 20 percent of a methyl alcohol solvent for a period of time depending on the desired content of the product, longer reaction times, e.g., 7 to 9 hours, giving higher yields of iminodipropionitriles. The nitrile product may then be hydrolyzed at a temperature between about 90° C. and about 125° C. with about 0.5 percent excess alkali metal hydroxide in the presence of a mixture of a low molecular weight alcohol coupling agent and water. Equal parts of water and alcohol are preferred but from one-third to three parts of water per part of alcohol are permissable. Alternately, the hydrolysis of the nitrile may be carried out in the presence of between about 5 and about 25 percent of a previously prepared aminocarboxylic acid product.

The aminocarboxylic acid surfactant compounds of the present invention have excellent color and odor, and due to their good solubility and wetting power, are ideally suited for use as wetting agents and emulsifiers.

Example I

Methyl - N - (γ - lauroxypropyl)-β-aminopropionate was prepared by cyanoethylating lauryl alcohol in the presence of a potassium hydroxide catalyst. Two mols of lauryl alcohol and 0.1 percent by weight of potassium hydroxide were placed in a reaction flask and heated with agitation until the potassium hydroxide was dissolved. The mixture was then cooled to room temperature and 2.5 mols of acrylonitrile was added at a rate such that the temperature did not exceed 45° C. The mixture was then stirred at 70° C. for one hour and the β-lauroxypropionitrile was recovered.

The β-lauroxypropionitrile was hydrogenated in the presence of a Raney nickel catalyst at 125° C. and with an ammonia partial pressure of 200 p.s.i.g. and a hydrogen partial pressure of 300 p.s.i.g. for a period of three hours.

One mol of the γ-lauroxypropylamine thus obtained and 40 grams of methyl alcohol was mixed with 1.1 mol of methylacrylate over a period of 15 minutes with vigorous agitation. The temperature was maintained at 25° C. by use of a water bath. After all the methylacrylate was added the reaction was maintained at 25° C. under agitation for a period of four hours. The reaction mixture was then allowed to stand overnight and the excess methylacrylate and methyl alcohol was removed by distillation at 60° C. and 15 mm. pressure. The product obtained analyzed 90 percent of methyl - N - (γ-lauroxypropyl) - β - aminopropionate and 10 percent of methyl-N-(γ-lauroxypropyl)-β-iminodipropionate.

0.513 mol of the product was hydrolyzed with 408 grams water in a pressure reactor at 107° C. for four hours after which a N - (γ - lauroxypropyl) - β-aminopropionic acid product having almost the theoretical acid number was obtained. The 50 percent solids product had a Gardner color of 1 to 3 and a 1.0 percent solids solution of the product was colorless and had good wetting power. The N-(γ-lauroxypropyl)-β-aminopropionic acid also greatly reduced the surface tension of water.

A further sample of the methyl ester was hydrolyzed under the same conditions with sodium hydroxide to provide a sodium salt of the aminopropionic acid. The sodium salt also had a Gardner color of 1 to 3, exhibited good wetting power and reduced the surface tension of water.

Example II

One mol of the γ-lauroxypropylamine prepared in accordance with Example I, and 20 grams of methyl alcohol was mixed with 1.05 mols of acrylonitrile over a period of 15 minutes with vigorous agitation. The temperature was maintained at 65° C. by use of a water bath. After the exothermic reaction was completed the product was distilled at 65° C. and 15 mm. pressure to remove excess acrylonitrile and methyl alcohol. A product which analyzed of 98 percent N-(γ-lauroxypropyl)-β-aminopropionitrile was obtained.

0.60 mol of the aminopropionitrile, 0.62 mol sodium hydroxide, 6.1 mols of water and 3.45 mols of methyl alcohol were agitated at 107° C. for six hours with periodic venting of ammonia. A sodium N - (γ-lauroxypropyl)-β-aminopropionate product was obtained which was a viscous clear solution. Dissolved ammonia was removed from the product by fractional distillation. The sodium salt had a Gardner color of 1 and had excellent foaming and wetting properties, and greatly reduced the surface tension of water.

A further 0.60 mol sample of the aminopropionitrile was mixed with 25 mols of water and 50 grams of a 30 percent aqueous solution of a sodium-N-(γ-lauroxypropyl)-β-aminopropionate, and the mixture was hydrolyzed in a continuous splitter at a temperature of 107° C. The aminopropionate product obtained also had a Gardner color of 1.

Example III

N - (γ -lauroxypropyl) - β - iminodipropionic acid and the sodium salt thereof was prepared in accordance with Example I using 2.1 mols of methylacrylate per mol of γ-lauroxypropylamine. The N - (γ - lauroxypropyl)-β-iminodipropionic acid and the sodium salt thereof had surfactant properties similar to the products of Example I.

Example IV

N-(γ-tridecyloxpropyl)-β-amino-(α-methyl) propionic acid was made by reacting one mol of γ-tridecyloxypropylamine, obtained by the cyanoethylation of tridecyl alcohol in accordance with Example I, with one mol of methylmethacrylate at 90° C. for 8 hours. The methyl-N-(γ-tridecyloxypropyl)-β-amino-(α-methyl) propionate product was then hydrolyzed with water to the corresponding propionic acid which had good color and exhibited surfactant properties substantially identical to the products of Examples I to III.

Example V 552 grams of a mixture of alkoxypropylamines having alkyl radicals from 12 to 15 carbon atoms was introduced into a Parr pressure reactor along with 233 grams of acrylonitrile, 55 grams of water, 39 grams of methyl alcohol and 2.6 grams of concentrated sulfuric acid. The temperature of the reactor was maintained at 100° C. for nine hours, and the pressure within the reactor was maintained at 50 p.s.i.g. When the reaction was completed, the sulfuric acid catalyst was neutralized with aqueous sodium hydroxide and excess acrylonitrile, water and methyl alcohol was removed with an aspirator at 60° C. An N-(γ-alkoxypropyl)-β-iminodipropionitrile product was obtained which was a viscous liquid containing 85 to 90 percent iminodipropionitrile, the remainder being aminopropionitrile. The product had a Gardner color of 2.

The iminodipropionitrile was then hydrolyzed with sodium hydroxide to obtain the amphoteric compound disodium-N-(γ-alkoxypropyl)-β-iminodipropionate. 500 grams of the ininodipropionitrile was introduced into a Parr pressure reactor along with 246 grams of water, 246 grams of methyl alcohol and 102 grams of sodium hydroxide. The reactor was heated to 120° C. for 30 minutes after which the temperature was reduced to 105° C. and held for a period of three hours. A pressure of 100 p.s.i.g. within the reactor resulted from the formation of byproduct ammonia during hydrolysis. The completion of the hydrolysis was determined by making one percent solutions of the product in cold water, the reaction being complete when the water solution was clear. The reactor was then cooled to room temperature and the byproduct ammonia was removed by distillation at 70° C. and at atmospheric pressure. It was necessary to add additional methyl alcohol to the product in order to replace that which is volatilized during the ammonia distillation. Sufficient methyl alcohol was added to obtain a product which contained 50 percent solids.

The product had a Gardner color of 2 and had good odor and exhibited good surfactant properties.

It can be seen that novel aminocarboxylic acid compounds have been provided which have good color and odor and which have a desirable low viscosity. Futhermore, the novel aminocarboxylic acids disclosed herein have good solubility and improved wetting power, and exhibit desirable surfactant properties in dilute solution.

Although certain features of the invention have been set forth with particularity in order to describe the invention, alternative embodiments within the skill of the art are contemplated.

Various of the features of the invention are set forth in the following claims.

What is claimed is:

1. An amphoteric surfactant of the formula $$RO[CH_2]_3N[H_n][R_1COOX]_{2-n}$$

wherein R is an alkyl radical of from 6 to 24 carbon atoms, $R_1$ is a straight or branched chain alkyl radical of from 1 to 3 carbon atoms, X is hydrogen or a salt forming radical, and $n$ is 0 or 1.

2. An amphoteric surfactant of the formula $$RO[CH_2]_3N[H_n][(CH_2)_2COOX]_{2-n}$$

wherein R is an alkyl radical of from 6 to 24 carbon atoms, X is hydrogen or a salt forming radical, and $n$ is 0 or 1.

3. An amphoteric surfactant of the formula $$RO[CH_2]_3N[H_n][(CH_2)_2COOX]_{2-n}$$

wherein R is an alkyl radical of from 10 to 15 carbon atoms, X is hydrogen or a salt forming radical, and $n$ is 0 or 1.

4. An amphoteric surfactant of the formula $$RO[CH_2]_3N[H_n][CH_2COOX]_{2-n}$$

where R is an alkyl radical of from 6 to 24 carbon atoms, X is hydrogen or a salt formin gradical, and $n$ is 0 or 1.

5. An amphoteric surfactant of the formula $$RO[CH_2]_3N[H_n][(CH_2)_3COOX]_{2-n}$$

wherein R is an alkyl radical of from 6 to 24 carbon atoms, X is hydrogen or a salt forming radical, and $n$ is 0 or 1.

6. An amphoteric surfactant of the formula $$RO[CH_2]_3N[H_n]\left[\begin{matrix}CHCHCOOX\\|\quad|\\R_1\ R_2\end{matrix}\right]_{2-n}$$

wherein R is an alkyl radical of from 6 to 24 carbon atoms, where one of $R_1$ and $R_2$ is a methyl radical and the other is hydrogen, X is hydrogen or a salt forming radical, and $n$ is 0 or 1.

7. N-(γ-lauroxypropyl)-β-aminopropionic acid and salts thereof.

8. N-(γ-lauroxypropyl)-β-aminodipropionic acid and salts thereof.

References Cited

UNITED STATES PATENTS

| | | | |
|---|---|---|---|
| 2,217,846 | 10/1940 | Orthner et al. | 260—501 |
| 2,316,606 | 4/1943 | Loder et al. | 260—534 |
| 2,468,012 | 4/1949 | Isbell | 260—534 |
| 2,840,600 | 6/1958 | Du Brow et al. | 260—501 |
| 2,993,918 | 7/1961 | Mannheimer | 260—534 XR |
| 3,255,248 | 6/1966 | Suessenguth et al. | 260—534 XR |
| 2,870,195 | 1/1959 | Heininger et al. | 260—484 |

LORRAINE A. WEINBERGER, *Primary Examiner.*

A. P. HALLUIN, *Assistant Examiner.*

U.S. Cl. X.R.

260—465.6, 584, 482, 501.11